(12) United States Patent
Akolekar et al.

(10) Patent No.: US 9,452,416 B2
(45) Date of Patent: Sep. 27, 2016

(54) COMPOSITIONS AND PROCESSES FOR SYNTHESIZING CUBIC MESOPOROUS SILICAS HAVING "NOODLE-LIKE" MORPHOLOGY

(71) Applicant: Dow Global Technologies LLC, Midland, MI (US)

(72) Inventors: Deepak Akolekar, Pune (IN); Phani Kiran Bollapragada, Pune (IN)

(73) Assignee: Dow Global Technologies LLC, Midland, MI (US)

( * ) Notice: Subject to any disclaimer, the term of this patent is extended or adjusted under 35 U.S.C. 154(b) by 41 days.

(21) Appl. No.: 14/431,084

(22) PCT Filed: Sep. 23, 2013

(86) PCT No.: PCT/US2013/061154
§ 371 (c)(1),
(2) Date: Mar. 25, 2015

(87) PCT Pub. No.: WO2014/055275
PCT Pub. Date: Apr. 10, 2014

(65) Prior Publication Data
US 2015/0251164 A1    Sep. 10, 2015

Related U.S. Application Data

(60) Provisional application No. 61/708,224, filed on Oct. 1, 2012.

(51) Int. Cl.
| | |
|---|---|
| B01J 21/08 | (2006.01) |
| B01J 37/00 | (2006.01) |
| B01J 37/04 | (2006.01) |
| C01B 33/12 | (2006.01) |
| C01B 37/02 | (2006.01) |

(52) U.S. Cl.
CPC ............. *B01J 21/08* (2013.01); *B01J 37/0018* (2013.01); *B01J 37/04* (2013.01); *C01B 33/12* (2013.01); *C01B 33/126* (2013.01); *C01B 37/02* (2013.01)

(58) Field of Classification Search
CPC ...................................................... B01J 23/08
See application file for complete search history.

(56) References Cited

U.S. PATENT DOCUMENTS

| | | |
|---|---|---|
| 6,174,512 B1 | 1/2001 | Kosuge et al. |
| 6,958,309 B2 | 10/2005 | Wang et al. |

FOREIGN PATENT DOCUMENTS

| | | |
|---|---|---|
| CN | 1380250 A | 11/2002 |
| CN | 1440928 A | 9/2003 |
| KR | 913998 B | 8/2009 |

OTHER PUBLICATIONS

Chang et al (MCM-48 nanorods: a self-assembled isotropic cubic mesostructure with anisotropic morphology, RSC Advances, 2012, 2, 12088-12090).*
Office Action dated May 3, 2016 pertaining to Chinese Patent Application No. 201380050633.7.
Kong et al: "Synthesis of hollow-shell MCM-48 using the ternary surfactant templating method", Microporous and Mesoporous Materials, Elsevier Science Publishing, New York, US, vol. 81, No. 1-3, Jun. 6, 2005, pp. 251-257, XP027704854.
Yuan p. et al: "Structure transition from hexagonal mesostructured rodlike silica to multilamellar vesicles", Langmuir 20080506 American Chemical Society US, vol. 24, No. 9, May 6, 2008, XP002717141.
Nang W-J et al: "Hexagonal mesoporous silica with noodle-like shape", Journal of Porous Materials Mar. 2004 Kluwer Academic Publishers NL, vol. 11, No. 2, Mar. 2004, pp. 71-78, XP002717140.
Lingdong Kong et al: "Synthesis of MCM-48 Single Crystals with Cube Morphology", Chemistry Letters, vol. 34, No. 4, 2005, pp. 568-569, XP002717139.
Yeh Y-Q et al: "Synthesis of hollow silica spheres with mesostructured shell using cationic—Anionic-neutral block copolymer ternary surfactants", Langmuir 20060103 American Chemical Society US, vol. 22, No. 1, Jan. 3, 2006. pp. 6-9, XP002717142.
B.-C. Chen et al: "Mesoporous Silica Platelets with Perpendicular Nanochannels via a Ternary Surfactant System", Advanced Materials, vol. 16, No. 18, Sep. 16, 2004, pp. 1657-1661, XP055014255.
PCT/US2013/061154 International Search Report & Written Opinion of the International Searching Authority mailed Dec. 11, 2015.
PCT/US2013/061154, International Preliminary Report on Patentability mailed Oct. 21, 2014.
PCT/US2013/061154, Demand and Response Written Opinion dated Jul. 31, 2014.
Dow Global Technologies LLC EP Appln. No. 13771725.2-1355, Communication pursuant to Rules 161(1) and 162 EPC dated May 18, 2015.

* cited by examiner

*Primary Examiner* — Melvin C Mayes
*Assistant Examiner* — Michael Forrest
(74) *Attorney, Agent, or Firm* — Dinsmore & Shohl LLP

(57) ABSTRACT

Cubic mesoporous silicas having substantially cylindrical morphology may be prepared using a combination of a first structure-directing template, such as tetramethyl ammonium hydroxide; water; a second structure-directing template, such as cetyltrimethylammonium bromide; a morphology-directing template, such as a poloxamer having a weight average molecular weight ranging from 5,000 to 20,000 Daltons; and a silica source; in the substantial absence of an alcohol solvent. The resulting materials may exhibit a three-dimensional channel structure, a length from 3 to 10 micrometers and a width from 300 nanometers to 10 micrometers, resulting in an aspect ratio from 1 to 300. Further characterization may include a surface area from 1300 to 1500 square meters per gram, an average pore diameter from 20 to 26 angstroms, and an average pore volume ranging from 0.7 to 1.1 cubic centimeters per gram. These materials are useful for molecular transport and release applications in a variety of uses, including, for example, membrane separations, metal incorporation, electronic devices, drug delivery, and adsorption.

9 Claims, No Drawings

COMPOSITIONS AND PROCESSES FOR SYNTHESIZING CUBIC MESOPOROUS SILICAS HAVING "NOODLE-LIKE" MORPHOLOGY

REFERENCE TO RELATED APPLICATIONS

The present application claims the benefit of U.S. Provisional Application No. 61/708,224, filed on Oct. 1, 2012.

BACKGROUND

1. Field of the Invention

This invention relates to the field of mesoporous silicas. More particularly, it relates to mesoporous silicas having three-dimensional channel systems.

2. Background of the Art

Mesoporous materials have been known to researchers for many years, and are used for a variety of applications. In general these materials are inorganic solid materials characterized by a porous structure which is formed by channels or pores, frequently having average diameters in a general range of from 2 to 50 nanometers (nm). The pores may be uniform with constant pore diameters, or non-uniform with a variety of pore diameters. The porous structure provides for a large internal surface area with adsorptive capacity for molecular species which are capable of entering the pores. The pores may be three-dimensional, penetrating essentially the entire volume of the solid material.

Mesoporous materials may be amorphous or crystalline. Examples of mesoporous materials include synthetic or natural crystalline pure silicates or aluminosilicates. Such may also be referred to as framework aluminosilicates where the framework is based on a three-dimensional network of $[(Al,Si)_4]$ tetrahedra which are linked to each other, at the corners, by shared oxygen atoms.

However, despite successful application of such mesoporous, or potentially mesoporous, silica materials in certain applications, some of these materials suffer from less than desirable properties or capabilities including, but not limited to, dispersion in a given desired medium, diffusion or selectivity in separations operations, and/or contact with adsorbates and/or reactants, and/or from other difficulties in their use in specific industrial streams. In view of the above it is desirable to develop new means of modifying silica-based mesoporous materials to reduce or eliminate one or more of these problems or limitations.

SUMMARY OF THE INVENTION

In one aspect the invention is a composition comprising a mesoporous silica having a three-dimensional channel structure of MCM-48 framework type, as defined by the International Zeolite Association, and having as further properties a length ranging from 3 micrometers (μm) to 10 μm and a width ranging from 300 nm to 10 μm, provided that the ratio of length to width characterizes an aspect ratio ranging from 1 to 300 and the morphology is substantially cylindrical; and further having a Brunauer-Emmett-Teller surface area from 1300 square meters per gram ($m^2/g$) to 1500 $m^2/g$, an average pore diameter from 20 angstroms (Å) to 26 Å, and an average pore volume ranging from 0.7 cubic centimeters per gram ($cm^3/g$) to 1.1 $cm^3/g$.

In another aspect the invention is a process for preparing a mesoporous catalyst comprising contacting as starting components (1) a first structure-directing template selected from the group consisting of tetramethylammonium hydroxide, tetraethylammonium hydroxide, tetrapropylammonium hydroxide, and combinations thereof; (2) water; (3) a second structure-directing template selected from the group consisting of cetyltrimethylammonium bromide cetyltrimethylammonium bromide (CTAB), hexadecyltrimethyl-ammonium chloride; hexadecyl trimethyl ammonium hydroxide hydrate, hexadecyltrimethylammonium p-toluenesulfonate, hexadecyl-trimethylammonium bis-sulfonate, and combinations thereof; (4) a morphology-directing template selected from the group consisting of poloxamers having a weight average molecular weight ranging from 5,000 Daltons (Da) to 20,000 Da; and (5) a silica source; in the substantial absence of an alcohol solvent; under conditions such that a mesoporous silica having a three-dimensional channel structure is formed. In particular embodiments the mesoporous silica is characterized as having a three-dimensional channel structure and a substantially cylindrical morphology, with a length ranging from 3 μm to 10 μm and a width ranging from 300 nm to 10 μm; provided that the length to width ratio characterizes an aspect ratio ranging from 1 to 300; and further having a Brunauer-Emmett-Teller surface area ranging from 1300 $m^2/g$ to 1500 $m^2/g$; an average pore diameter ranging from 20 Å to 26 Å; and an average pore volume ranging from 0.7 $cm^3/g$ to 1.1 $cm^3/g$.

DETAILED DESCRIPTION OF THE EMBODIMENTS

The invention produces mesoporous silicas that have a morphology alternatively described as being "substantially noodle-like," having controllable length and width and therefore offering greater control in their use in applications including, but not limited to, gas separations, in electronic devices for purposes such as regulation of current flow and for thermal stability, and for drug and fragrance release, gas sensing, heavy metal removal, and water purification. As the term is used herein, "substantially noodle-like" means being "substantially cylindrical," with the term "substantially" being defined herein as equivalent to the word "predominantly," meaning that, upon visual inspection of transmission electron micrographs (TEMs) thereof, the silicas appear to be configured, to a greater extent, as cylinders. Furthermore, both "substantially noodle-like" and "substantially cylindrical" characterize particular embodiments wherein the length is equal to or greater than the width (i.e., having an aspect ratio ranging from 1 to 300), and therefore by definition require that the morphology be such that an aspect ratio is calculable therefor. Finally, the term "noodle-like," in particular, recognizes that, in certain particular but non-limiting embodiments, there is a tendency of the mesoporous silicas to appear curled.

The mesoporous silica may be effectively prepared by a process generally defined as including contact of at least five (5) components. These components are (1) a first structure-directing template selected from the group consisting of tetramethyl ammonium hydroxide (TMAOH), tetraethyl ammonium hydroxide (TEAOH), tetrapropyl ammonium hydroxide (TPAOH), and combinations thereof; (2) water; (3) a second structure-directing template selected from the group consisting of cetyltrimethylammonium bromide (CTAB), hexadecyltrimethylammonium chloride; hexadecyl trimethyl ammonium hydroxide hydrate, hexadecyltrimethylammonium p-toluenesulfonate, hexadecyl-trimethylammonium bis-sulfonate, and combinations thereof; (4) a morphology-directing template selected from the group consisting of poloxamers having a weight average molecular weight ranging from 5,000 Da to 20,000 Da; and (5) a silica source. The water serves to facilitate the formation of the desired mesoporous silica product.

It is noted that "structure-directing" and "morphology-directing" are differentiated according to the definitions of "structure" and "morphology." As used herein, "structure" refers to the molecular framework of the silicate material, including, for example, the elements, the shape of the molecule, the bonding types, and the charges. This may be represented by, for example, a structural formula. In contrast thereto, "morphology" refers to the gross overall shape of the particle that is formed when a number of the molecules are joined. Morphology may be easily seen upon visual inspection of, for example, transmission electron micrographs (TEMs).

Sources of each of the components are most conveniently via commercial purchase, or via direct preparation prior to use in the invention. For example, the first structure-directing template may be selected from tetramethylammonium hydroxide (TMAOH), tetraethylammonium hydroxide (TEAOH), tetrapropylammonium hydroxide (TPAOH), and combinations thereof, with TMAOH being particularly preferred. Preparation of these may be by any effective means, including in non-limiting example hydrolysis of tetramethylammonium cetyl iodide (TMACl), tetramethylammonium bromide (TMABr), tetraethylammonium bromide (TEABr), or tetrapropylammonium bromide (TPABr), respectively.

Water used in the invention is preferably deionized (DI) water.

The second structure-directing template may be also be purchased commercially or prepared prior to use in the invention. For example, where a preferred second structure-directing template, cetyltrimethylammonium bromide (CTAB), is selected, it may be prepared by brominating a hexadecyl quaternary ammonium compound. Related compounds based on quaternary trimethylammonium compounds, including hexadecyltrimethylammonium chloride, hexadecyltrimethylammonium hydroxide hydrate, hexadecyltrimethylammonium p-toluenesulfonate, hexadecyltrimethylammonium bis-sulfonate, and combinations thereof, may alternatively be employed in the inventive process.

At least one block copolymer surfactant is also included as a starting material. This material is crucial for its role as a morphology-directing template. The poloxamer is desirably non-ionic and has a weight average molecular weight ranging from 5,000 Da to 20,000 Da, more desirably from 5,000 Da to 13,000 Da, still more desirably from 5,500 Da to 12,500 Da. In general more linear surfactants may be useful in increasing the length of the product. Suitable non-limiting examples may include PLURONIC P-123, PLURONIC F-127, and combinations thereof. PLURONIC is a trademark of BASF Corporation. PLURONIC P-123 is a triblock copolymer based on poly(ethylene glycol)-poly(propylene glycol)-poly(ethylene glycol), having a molecular weight of about 5,800 Da. PLURONIC F-127 is described as a hydrophilic nonionic, surfactant polyol having a central hydrophobic block and a molecular weight of approximately 12,500 Da. Such materials, i.e., block copolymer surfactants, are known generically as poloxamers. In particularly preferred embodiments, a combination of PLURONIC P-123 and PLURONIC F-127 may be employed.

The silica source may be any conventionally known, such as fumed silica, colloidal silica, sodium silicate, tetraethyl orthosilicate (TEOS), or a combination thereof. In preferred embodiments a silica having a relatively high Brunauer-Emmett-Teller surface area, preferably at least 100 $m^2/g$, more preferably at least 120 $m^2/g$, and still more preferably at least 150 $m^2/g$, may be employed. Sources of the silica may be, for example, organic sources, such as rice husks, and/or mineral sources, such as sand, quartzite, talc and mica.

In preparing the mesoporous silica materials of the invention, the required components (1)-(5) are combined such that contact between them is as extensive and continuous as possible throughout a period of time until the inventive products are formed to a desired extent, preferably to or near a maximum yield thereof. Such is conveniently carried out, in one particularly preferred embodiment, by adding the components, in the order (1)-(5) as given hereinabove and as exemplified in Examples 3 and 4 herein. During this process the components are desirably stirred together, preferably at a rate termed "vigorously," which is defined as being from 300 revolutions per minute (rpm) to 700 rpm. Stirring rate facilitates the synthesis process. In preferred embodiments, the temperature during the synthesis period is desirably maintained within a range from 25 degrees Celsius (° C.) to 190° C., and more desirably from 25° C. to 170° C. The synthesis period may range from 5 hours (h) to 100 h, and preferably from 10 h to 40 h, and pressure may range from 101 kilopascals (kPa) to 1000 kPa.

Proportions of the starting components are desirably controlled in order to ensure formation of the inventive compositions. In general, based upon 1 mole (mol) of the selected silica source, the amount of the first structure-directing template may desirably range from 0.1 mol to 0.5 mol. The amount of water may range from 20 mol to 80 mol, and preferably 40 mol to 70 mol. The amount of the second structure-directing template may range from 0.25 mol to 0.5 mol. The total morphology-directing template (poloxamer) amount may range from 0.0001 mol to 0.7 mol, preferably from 0.4 mol to 0.6 mol, more preferably 0.5 mol. Where a combination of PLURONIC P-123 and PLURONIC F-127 is used as the morphology-directing template, it is particularly desirable that the amount of PLURONIC P-123 range from 0.0001 mol to 0.2 mol and the amount of PLURONIC F-127 range from 0.0001 mol to 0.3 mol. Further helpful direction may be found in a preferred molar ratio of PLURONIC P-123 to PLURONIC F-127 ranging from 1.6:1 to 2500:1; of CTAB (or other second structure-directing template) to PLURONIC P-123 ranging from 15:1 to 522:1; and of CTAB (or other second structure-directing template) to PLURONIC F-127 ranging from 10:1 to 990:1.

An additional component, a promoter, may in some less preferred embodiments be optionally included among the starting materials, particularly where tetraethyl orthosilicate (TEOS) is selected as the silica source. Such promoters may be selected from alkali and alkaline nitrates, sulfates, chlorides, and combinations thereof, including, in non-limiting example, sodium nitrate ($NaNO_3$). These materials may help to accelerate crystal growth in definite patterns, and may also provide thermal stability to the mesoporous materials. However, such promoters may be less desirable or even deleterious to achieving the desired noodle-like morphology where silica sources such as fumed silica are employed. If a promoter is used, a desired amount is preferably from greater than 0 mol to 0.3 mol, based on 1 mol of silica.

Of particular importance in the present invention is that alcohol, in any form, be substantially absent from the synthesis mixture. In particular, this means that alcohol is not used as a solvent therein. Such absence is desirably essentially absolute, but the presence of alcohol in trace amounts, less than 0.2 percent by weight, may be tolerated and falls within the definition of "substantial absence" of alcohol solvent. Included within the definition of alcohols are any organic materials having a functional hydroxyl group, with the exception of those specifically named as possible first or second structure-directing template selections.

Once product synthesis is visually observed, the product may be filtered and washed using means and methods well known to those skilled in the art. Filtration using a suitable filter means, preferably of 650 to 2000 U.S mesh size, followed by washings in DI water, is desirable. Drying using conventional means and temperatures ranging from 80° C. to 100° C., with or without subsequent calcinations at temperatures ranging from 500° C. to 650° C. (with or without steam) may also be preferably employed, in order to increase the porosity of the final mesoporous silica material.

The final product is, in preferred embodiments, a mesoporous silica having unique physical characteristics. These characteristics may be generally described as including a three-dimensional channel structure, with a length ranging from 3 µm to 10 µm, preferably from 4 µm to 10 µm, and a width ranging from 300 nm to 10 µm, preferably from 500 nm to 10 µm, provided that the ratio of length to width characterizes an aspect ratio ranging from 1 to 300, preferably from 5 to 300. Furthermore, the mesoporous silica desirably exhibits a Brunauer-Emmett-Teller surface area ranging from 1300 $m^2/g$ to 1500 $m^2/g$, and preferably 1350 $m^2/g$ to 1450 $m^2/g$; an average pore diameter ranging from 20 Å to 26 Å, and preferably 22 Å to 25 Å; and an average pore volume ranging from 0.7 $cm^3/g$ to 1.1 $cm^3/g$, preferably from 0.7 $cm^3/g$ to 0.9 $cm^3/g$, and still more preferably from 0.74 $cm^3/g$ to 0.89 $cm^3/g$. Because of these characteristics, the inventive materials may be conveniently visualized as having a "noodle-like" morphology, with the "pores" being essentially three-dimensional channels in the substantially cylindrical materials.

The desired mesoporous silica also has an MCM-48 framework type, as defined by the International Zeolite Association (IZA). This means that while its bicontinuous structure is still centered on the gyroid minimal surface (i.e., it is "cubic"), as is the case with all MCM-48 silicas, its gross configuration varies from other known MCM-48 materials which are spherical, semi-circular, or irregular. Such configurations generally provide less surface area, smaller average pore diameters, and smaller pore volumes than those of the inventive compositions. Such other MCM-48 materials are therefore anticipated to be less useful and/or less selective for a variety of applications, such as those involving transport and release as described hereinabove, than the inventive compositions. Confirmation of the given physical characteristics may be by means readily known to those skilled in the art, including, in non-limiting example, X-ray diffraction (XRD), scanning electron microscopy (SEM), transmission electron microscopy (TEM), Fourier transmission infrared spectroscopy (FTIR), Fourier transmission-Raman (FT-Raman) spectroscopy, and/or nuclear magnetic resonance (e.g., nitrogen adsorption measurements).

EXAMPLES

Example 1 (Comparative, CEx. 1)

Molar composition of mixture: 1.0 TEOS; 0.65 CTAB; 0.5 NaOH; 62 $H_2O$; 0.1 $NaNO_3$.

10 mol of tetraethyl orthosilicate (TEOS) is mixed with 50 milliliters (mL) of DI water and the mixture is vigorously stirred, at a rate within a range from 300 rpm to 700 rpm, for 1 h at 35° C., then 0.9024 g of NAOH is added followed by 0.3835 g of $NaNO_3$ as a promoter. After another 1 h of vigorously stirring at 35° C., 10.69 g of CTAB is added to the mixture and stirring is continued at 95° C. for an additional 1 h. Finally the mixture is heated in an autoclave under static conditions at 125° C. for 24 h. The resulting product is filtered, washed with DI water, and dried at 100° C.

Example 2 (Comparative, CEx. 2)

Molar composition of mixture: 1.0 $SiO_2$; 0.317 TMAOH; 0.45 CTAB; 67 $H_2O$.

6.16 g of TMAOH (25 weight percent (wt %) solution in $H_2O$) is diluted with an additional 59.36 of DI water before adding thereto 9.424 g of CTAB under vigorous stirring. After 15 minutes (min), 3.2 g of fumed silica (AEROSIL aerogel; AEROSIL is a trademark of Evonik Industries) is added. Stirring is continued for an additional 30 min and the gel obtained is transferred into a TEFLON-lined autoclave. The gel is heated statically in the autoclave at 132° C. for 40 h under autogenous pressure.

Example 3 (Inventive, Ex. 3)

Molar composition of mixture: 1.0 $SiO_2$; 0.317 TMAOH; 0.307 CTAB; 0.000588 PLURONIC P-123; 67 $H_2O$.

6.16 g of TMAOH (25 weight percent (wt %) solution in $H_2O$) is diluted with an additional 59.36 of DI water before adding thereto 6.424 g of CTAB and 3.41 g of PLURONIC P-123 under vigorous stirring. After 15 min, 3.2 g of fumed silica (AEROSIL) is added. Stirring is continued for an additional 30 min and the gel obtained is transferred into a TEFLON-lined autoclave. The gel is heated statically in the autoclave at 132° C. for 40 h under autogenous pressure.

Example 4 (Inventive, Ex. 4)

Molar composition of mixture: 1.0 $SiO_2$; 0.317 TMAOH; 0.307 CTAB; 0.000311 PLURONIC F-127; 67 $H_2O$.

6.16 g of TMAOH (25 weight percent (wt %) solution in $H_2O$) is diluted with an additional 59.36 of DI water before adding thereto 6.424 g of CTAB and 3.98 g of PLURONIC F-127 under vigorous stirring. After 15 min, 3.2 g of fumed silica (AEROSIL) is added. Stirring is continued for an additional 30 min and the gel obtained is transferred into a TEFLON-lined autoclave. The gel is heated statically in the autoclave at 132° C. for 40 h under autogenous pressure.

Example 5 (Comparative, CEx. 5)

Molar composition of mixture: 1.0 $SiO_2$; 0.250 CTAB; 0.02 PLURONIC P-123; 0.50 NaOH; 61 $H_2O$.

4.11 g CTAB and 5.23 g of PLURONIC P-123 are homogeneously dissolved into DI water and the mixture is stirred vigorously for 40 min at 35° C. 0.90 g of NaOH is added to the mixture. After 5 min, 10 mL of TEOS is added dropwise under vigorous stirring. Stirring is continued for 2 h, and the mixture is transferred into a TEFLON-lined autoclave. The gel is heated statically in the autoclave at 132° C. for 40 h under autogenous pressure.

Example 6 (Comparative, CEx. 6)

Molar composition of mixture: 1.0 $SiO_2$; 0.150 CTAB; 0.0125 PLURONIC P-123; 0.50 NaOH; 61 $H_2O$.

2.055 g CTAB and 3.271 g of PLURONIC P-123 are homogeneously dissolved into 50 g DI water and the mixture is stirred vigorously for 40 min at 35° C. Then 0.902 g of NaOH is added to the mixture. After 5 min, 10 mL of TEOS is added dropwise under vigorous stirring. Stirring is continued for 2 h, and the mixture is transferred into a TEFLON-lined autoclave. The gel is heated statically in the autoclave at 0° C. for 56 h under autogenous pressure

Example 7 (Comparative, CEx. 7)

The mesoporous silica compositions prepared in Comparative Examples 1, 2, 5, and 6 and in Examples 3 and 4 are characterized using as methods X-ray diffraction (XRD), Brunauer-Emmett-Teller (BET) surface area via nitrogen physisorption, scanning electron microscopy (SEM), and transmission electron microscopy (TEM). XRD patterns of all samples are recorded on the PANanalytical instrument and X'pert PRO X-ray diffractometer using a copper radiation source. Nitrogen isotherms are determined using a Leica 440 SEM instrument. TEM micrographs are recorded using a Jeol 2010 instrument. Table 1 provides the composition, morphology and crystal size, surface area, pore volume and average pore diameter of the mesoporous silicas characterized.

TABLE 1

Characteristics of Mesoporous Silicas 1-6

| Example or Comparative | Composition | Morphology & crystal size | Surface area (BET), $m^2/g$ | Pore volume, $cm^3/g$ | Average pore diameter, nm |
|---|---|---|---|---|---|
| CEx. 1 | 1.0 TEOS; 0.65 CTAB; 0.5 NaOH; 62 $H_2O$, 0.1 $NaNO_3$ | Spherical, ~300 nm* | 1425 | 1.077 | 23.55 |
| CEx. 2 | 1.0 $SiO_2$; 0.317 TAOH; 0.45 CTAB; 67 $H_2O$ | Semi-circular, >5 μm* | 1349 | 0.64 | 21.94 |
| Ex. 3 | 1.0 $SiO_2$; 0.317 TMAOH; 0.307 CTAB; 0.000588 PLURONIC P-123; 67 $H_2O$ | Noodle-shaped, width ~300 nm, length >7 μm** | 1438 | 0.74 | 22.6 |
| Ex. 4 | 1.0 $SiO_2$; 0.317 TMAOH; 0.307 CTAB; 0.000311 PLURONIC F-127; 67 $H_2O$ | Noodle-shaped, width >3 μm, length 7 μm*** | 1359 | 0.84 | 24.1 |
| CEx. 5 | 1.0 TEOS; 0.3 CTAB; 0.02 PLURONIC P-123; 0.5 NaOH; 61 $H_2O$ | Spherical, 200-600 nm* | 1094 | 0.79 | 27.0 |
| CEx. 6 | 1.0 TEOS; 0.125 CTAB; 0.0125 PLURONIC P-123; 0.5 NaOH; 61 $H_2O$ | Irregular, ~3 μm* | 1223 | 0.76 | 22.5 |

*These morphologies are such that an aspect ratio cannot be calculated therefor.
**Aspect ratio calculated as greater than 23.
***Aspect ratio calculated as up to 2.3.

What is claimed is:

1. A composition comprising a mesoporous silica having a three-dimensional channel structure of MCM-48 framework type, as defined by the International Zeolite Association, and having as further properties a length ranging from 3 micrometers to 10 micrometers and a width ranging from 300 nanometers to 10 micrometers, provided that the ratio of length to width characterizes an aspect ratio ranging from 1 to 300 and the morphology is substantially cylindrical; and further having a Brunauer-Emmett-Teller surface area from 1300 square meters per gram to 1500 square meters per gram, an average pore diameter from 20 angstroms to 26 angstroms, and an average pore volume ranging from 0.7 cubic centimeters per gram to 1.1 cubic centimeters per gram.

2. The composition of claim 1 wherein the mesoporous silica is characterized by at least one property selected from the group consisting of a length from 4 micrometers to 10 micrometers, a width from 500 nm to 10 micrometers, an aspect ratio from 5 to 300, a Brunauer-Emmett-Teller surface area from 1350 square meters per gram to 1450 square meters per gram, an average pore diameter from 22 angstroms to 25 angstroms, an average pore volume from 0.75 cubic centimeters per gram to 0.9 cubic centimeters per gram, and combinations thereof.

3. The composition of claim 1 wherein the mesoporous silica further exhibits a curled morphology.

4. A process for preparing a mesoporous silica comprising contacting as starting components
(1) a first structure-directing template selected from the group consisting of tetramethylammonium hydroxide, tetraethylammonium hydroxide, tetrapropylammonium hydroxide, and combinations thereof;
(2) water;
(3) a second structure-directing template selected from the group consisting of cetyltrimethylammonium bromide cetyltrimethylammonium bromide, hexadecyltrimethylammonium chloride; hexadecyl trimethyl ammonium hydroxide hydrate, hexadecyltrimethylammonium p-toluenesulfonate, hexadecyltrimethyl-ammonium bis-sulfonate, and combinations thereof;
(4) a morphology-directing template selected from the group consisting of poloxamers having a weight average molecular weight ranging from 5,000 Daltons to 20,000 Daltons; and
(5) a silica source;
in the substantial absence of an alcohol solvent;
under conditions such that a mesoporous silica having a three-dimensional channel structure and a substantially cylindrical morphology is formed.

5. The process of claim 4, wherein
the first structure-directing template is tetramethylammonium hydroxide;
the second structure-directing template is cetyltrimethylammonium bromide; and
the morphology-directing template is a combination of components
(a) a non-ionic triblock copolymer based on poly (ethylene glycol)-poly(propylene glycol)-poly(ethylene glycol), having a molecular weight of 5,800 Daltons, and
(b) a hydrophilic nonionic, surfactant polyol having a central hydrophobic block and a molecular weight of 12,500 Daltons.

6. The process of claim 5 wherein the (a) and (b) components are in a molar ratio of (a):(b) ranging from 1.6:1 to 2500:1.

7. The process of claim 4, wherein, based upon one mole of the silica, the amount of the first structure-directing template ranges from 0.1 mole to 0.5 mole; the amount of the water ranges from 20 moles to 80 moles; the amount of the second structure-directing template ranges from 0.25 mole to 0.5 mole; and the amount of the morphology-directing template ranges from 0.0001 mole to 0.7 mole.

8. The process of claim 4, wherein the starting components are combined in order (1) to (5), with (1) being first and (5) last, and further wherein the starting components are stirred at a rate ranging from 300 revolutions per minute to 700 revolutions per minute while the mesoporous silica is forming.

9. The process of claim 4 wherein the conditions are selected from the group consisting of a temperature ranging from 25° C. to 190° C.; a time ranging from 5 hours to 100 hours; a pressure ranging from 101 kilopascals to 1000 kilopascals; and combinations thereof.

* * * * *